(12) United States Patent
Bruno et al.

(10) Patent No.: US 9,942,128 B2
(45) Date of Patent: Apr. 10, 2018

(54) METHOD AND APPARATUS FOR ELASTIC OPTICAL NETWORKING

(71) Applicant: Telefonaktiebolaget LM Ericsson (publ), Stockholm (SE)

(72) Inventors: Gianmarco Bruno, Genoa (IT); Diego Caviglia, Stockholm (SE); Daniele Ceccarelli, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 15/039,236

(22) PCT Filed: Nov. 29, 2013

(86) PCT No.: PCT/EP2013/075155
§ 371 (c)(1),
(2) Date: May 25, 2016

(87) PCT Pub. No.: WO2015/078531
PCT Pub. Date: Jun. 4, 2015

(65) Prior Publication Data
US 2017/0048134 A1    Feb. 16, 2017

(51) Int. Cl.
*H04J 14/00* (2006.01)
*H04L 12/729* (2013.01)
(Continued)

(52) U.S. Cl.
CPC ........... *H04L 45/125* (2013.01); *H04B 10/27* (2013.01); *H04L 45/127* (2013.01); *H04L 45/28* (2013.01);
(Continued)

(58) Field of Classification Search
CPC ..... H04L 45/125; H04L 45/127; H04L 45/28; H04L 45/30; H04L 45/302; H04L 45/62; H04L 45/64; H04B 10/27; H04B 10/25753; H04B 10/25754; H04B 10/25755; H04B 10/25756; H04B 10/25758; H04B 10/271; H04B 10/272; H04B 10/278;
(Continued)

(56) References Cited

U.S. PATENT DOCUMENTS

2004/0205239 A1    10/2004  Doshi et al.
2013/0039651 A1*   2/2013   Sadananda ......... H04Q 11/0062
                                                      398/26
(Continued)

OTHER PUBLICATIONS

Paola Iovanna et al. ("A Traffic Engineering System for Multilayer Networks Based on the GMPLS Paradigm", IEEE Network, Mar./Apr. 2003, pp. 28-37).*
(Continued)

*Primary Examiner* — M. R. Sedighian
(74) *Attorney, Agent, or Firm* — Baker Botts, LLP

(57) ABSTRACT

A method of determining a path in an optical server network (31) comprises obtaining an indication of an amount of premium traffic from a client network (21). The method further comprises considering paths (48) utilising an elastic capability of one or more network elements (30) of the optical server network, and selecting a path from the considered paths, wherein the path is selected based at least partially on having at least a capacity to carry the amount of premium traffic.

19 Claims, 6 Drawing Sheets

(51) Int. Cl.
| | |
|---|---|
| *H04L 12/721* | (2013.01) |
| *H04L 12/725* | (2013.01) |
| *H04L 12/715* | (2013.01) |
| *H04L 12/703* | (2013.01) |
| *H04B 10/27* | (2013.01) |
| *H04Q 11/00* | (2006.01) |
| *H04J 14/02* | (2006.01) |

(52) U.S. Cl.
CPC ............ *H04L 45/30* (2013.01); *H04L 45/302* (2013.01); *H04L 45/62* (2013.01); *H04L 45/64* (2013.01); *H04Q 11/0062* (2013.01); *H04J 14/02* (2013.01); *H04Q 2011/009* (2013.01); *H04Q 2011/0073* (2013.01)

(58) Field of Classification Search
CPC ....... H04Q 11/0062; H04Q 2011/0073; H04Q 2011/009; H04J 14/02
USPC ..................................................... 398/45, 57
See application file for complete search history.

(56) References Cited

U.S. PATENT DOCUMENTS

2013/0163983 A1* 6/2013 Skoog ................ H04J 14/0227
                                                        398/5
2014/0093231 A1* 4/2014 Fisher ................... H04B 10/03
                                                        398/2

OTHER PUBLICATIONS

Adaptive Spectrum Control and Management in Elastic Optical Networks by Ke Wen et al.; IEEE Journal on Selected Areas in Communications, vol. 31, No. 1—Jan. 2013.
A Traffic Engineering System for Multilayer Networks Based on the GMPLS Program by Paola Iovanna et al.; 2003 IEEE—Mar./Apr. 2003.
Datarate Adaptation for Night-Time Energy Savings in Core Networks by Annalisa Morea; Journal of Lightwave Technology, vol. 31, No. 5—Mar. 1, 2013.
Efficiency Gain From Elastic Optical Networks by Annalisa Morea et al.; Invited Paper; Proc. of SPIE-OSA-IEEE/vol. 8309—2011.
Rate-Varying Optical Protection: Performance Analysis for Pre-Planned Structured Data Traffic by Anna Lidia Soso et al.; Ericsson Telecommunicazioni, Genoa, Italy—May 2013.
Spectrum-Efficient and Scalable Elastic Optical Path Network: Architecture, Benefits, and Enabling Technologies by Masahiko Jinno et al.; Topics in Optical Communications; IEEE Communications Magazine—Nov. 2009.
International Search Report for International application No. PCT/EP2013/075155—dated Mar. 6, 2014.

* cited by examiner

METHOD AND APPARATUS FOR ELASTIC OPTICAL NETWORKING

PRIORITY

This nonprovisional application is a U.S. National Stage Filing under 35 U.S.C. § 371 of International Patent Application Ser. No. PCT/EP2013/075155, filed Nov. 29, 2013, and entitled "A Method And Apparatus For Elastic Optical Networking."

TECHNICAL FIELD

Aspects of the invention relate to a method and apparatus for elastic optical networking. Aspects of the invention relate to a method and apparatus for a method and apparatus in a server network and in a client network.

BACKGROUND

Elastic optical networking (EON) provides for flexible bandwidth channels that match an allocated bandwidth with a traffic demand. For example, elastic optical networking provides for the changing of modulation format and/or symbol rate of a transmission. This allows the occupied bandwidth, which depends on the symbol rate, and reach of the transmission, to be changed. Elastic optical networking is described in Jinno et al "Spectrum-efficient and scalable elastic optical path network: architecture, benefits, and enabling technologies", IEEE Communications Magazine, November 2009.

The Elastic optical network may control a spectrum allocation using a flexible grid, as described in Proietti et al "Adaptive Spectrum Control and Management in Elastic Optical Networks", IEEE JSAC, January 2013.

Rate-tunable optical interfaces allow different optical line rates between working and protection paths, as described in Soso et al "Rate-Varying Optical Protection: Performance Analysis for Pre-planned Structured Data Traffic, proc. Fotonica (Milan, Italy) May 2013.

Elastic optical networking may provide for power saving, as described in Morea et al, "Datarate Adaptation for Night-Time Energy Savings in Core Networks" IEEE JLT March 2013. Elastic optical networking may provide for a reduction of, as described in Morea et al, "Efficiency gain from elastic optical networks", Proc. of ACP November, 2011.

The prior art does not provide for fully utilizing the advantages of elastic optical networks.

SUMMARY

A first aspect of the present invention provides a method of determining a path in an optical server network. The method comprises obtaining an indication of an amount of premium traffic from a client network. The method further comprises considering paths utilising an elastic capability of one or more network elements of the optical server network, and selecting a path from the considered paths, wherein the path is selected based at least partially on having at least a capacity to carry the amount of premium traffic.

Thus, an effective use of the elastic capability of the server network is made.

Optionally, an indication of the amount of premium traffic is received over a user network interface (UNI).

A second aspect of the present invention provides a control plane protocol for an optical server network. The control plane protocol is configured to obtain an indication of an amount of premium traffic from a client network, and consider paths utilising an elastic capability of one or more network elements of the optical server network. The control plane protocol is configured to select a path from the considered paths, wherein the path is selected based at least partially on having at least a capacity to carry the amount of premium traffic.

A third aspect of the present invention provides an apparatus configured to determine a path in an optical server network. The apparatus comprises a receiving unit configured to obtain an indication of an amount of premium traffic from a client network, and a path calculation unit configured to consider paths utilising an elastic capability of one or more network elements of the optical server network. The path calculation unit is further configured to select a path from the considered paths, wherein the path is selected based at least partially on having at least a capacity to carry the amount of premium traffic.

A fourth aspect of the present invention provides a protocol for a user network interface (UNI) between a control plane of an elastic optical server network and a client network. The protocol is configured to transmit an indication of an amount of premium traffic from the client network to the optical server network.

A fifth aspect of the present invention provides a method of a client network connected to an optical server network. The method comprises transmitting information of an amount of premium traffic from the client network to the optical server network, wherein the optical server network is an elastic optical network.

A sixth aspect of the present invention provides an apparatus configured to control transmission of traffic from a client network to an optical server network. The apparatus comprises a transmission unit configured to transmit information of an amount of premium traffic from a client network to the optical server network, wherein the optical server network is an elastic optical network.

A further aspect of the present invention provides a computer program product, configured when run on a computer to conduct a method according to any aspect of the invention.

BRIEF DESCRIPTION OF THE DRAWINGS

Embodiments of the present invention will now be described, by way of example only, with reference to the accompanying drawings in which.

DETAILED DESCRIPTION

Figure 1:
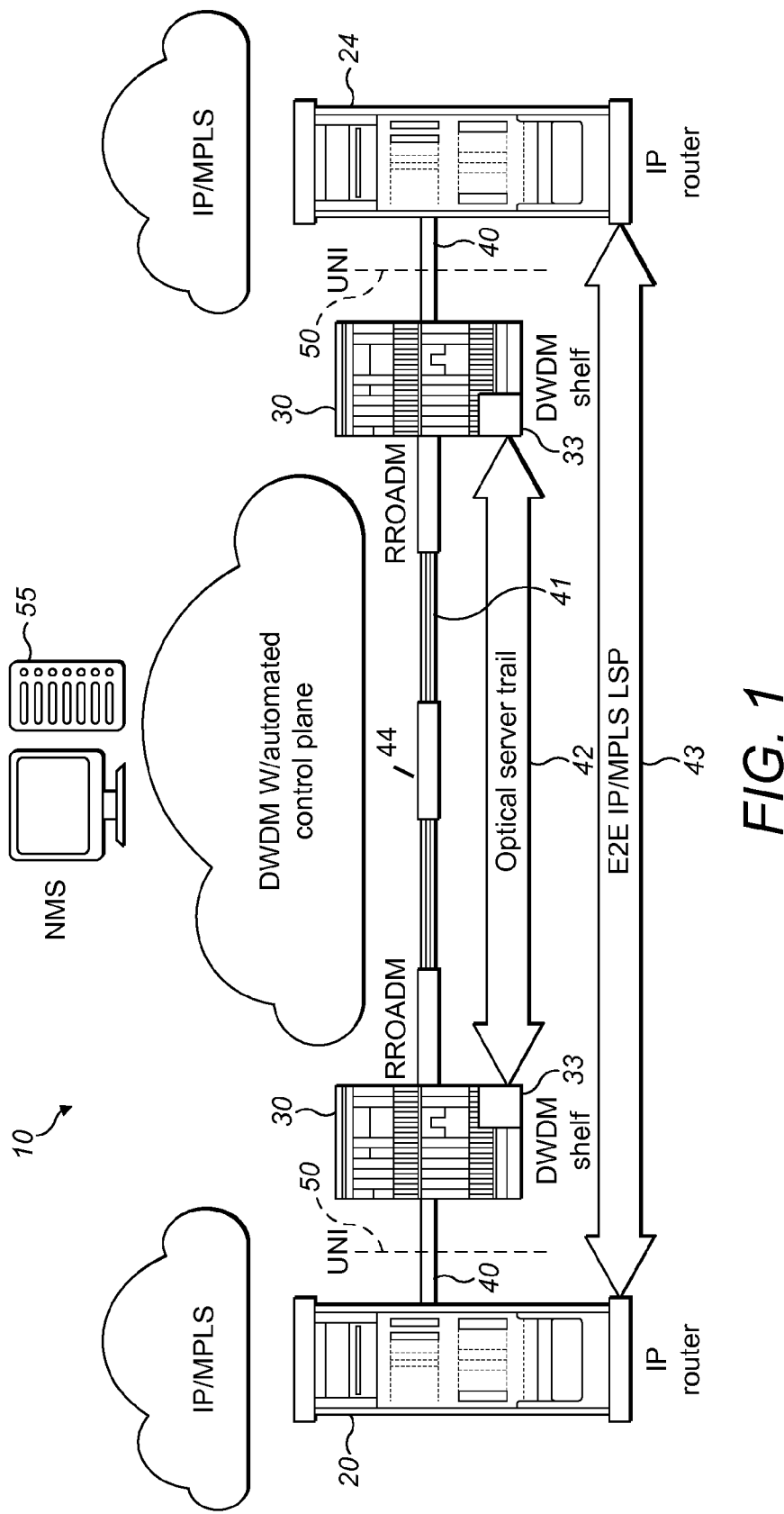
FIG. 1 shows an example of a network according to an example of the invention.

FIG. 1 shows an example network 10. The network 10 comprises client nodes 20 and server nodes 30. One or more client nodes 20 are connected to another one or more client nodes 24 by the server nodes 30. A group of client nodes may be considered as forming a client network 20,24 or client layer network. In some examples, the client nodes 20,24 are routers, e.g. packet or IP routers.

The client network may be considered as a client of an underlying server or transport network provided by the server nodes 30. The server network may be a wavelength division multiplexed (WDM) network, e.g. a dense WDM (DWDM) network. Any type of node may alternatively be referred to as a network element The plurality of server nodes 30 and client nodes 20,24 can be considered as an Automatic switched-transport network (ASON). In some aspects, the arrangement may be considered as an overlay model. The overlay model is described in IETF RFC 4208. The client nodes 20,24 may be considered to be part of a single overlay network. The separate groups of one or more client nodes 20,24 may be considered as a single overlay network. The overlay network is segmented.

In some aspects, the server nodes 30 may be referred to as core nodes, and form a core network. The client nodes 20,24 may be referred to as edge nodes. The term 'edge node' is in respect of the core network, not the overlay network. The edge nodes shown may be connected to other nodes (not shown in FIG. 1). In some examples, only the edge nodes can signal to set up links across the core to other edge nodes.

The server nodes 30 are connected by one or more links 41, e.g. optical links (fiber). The server nodes 30 define a transport network, and in particular, an optical transport network. The server nodes 30 may be considered as forming an optical server network.

The server nodes 30 are configured for optical switching of WDM signal. In some examples, the server nodes 30 are configured to switch at the wavelength layer, e.g. lambda switching. In some examples, the server nodes 30 are optical add-drop multiplexers, e.g. reconfigurable optical add-drop multiplexer (ROADM) or remotely reconfigurable add/drop multiplexer (RROADM), or optical cross-connect (OXC) switches.

In some examples, one or more server nodes 30 are directly attached to a client node 20,24 e.g. with a grey interface 40. In some aspects, the server nodes 30 comprise a WDM shelf or DWDM shelf. The server nodes 30 comprise transponders 33 arranged to send and receive an optical signal to or from a fiber link 41. Optionally, the links 41 comprise one or more line amplifiers 44. The client nodes 20,24 and server nodes 30 are considered as separate network elements (NEs).

An optical server trail 42 extends between the server nodes 30. An end-to-end path 43 extends between the client nodes 20,24 e.g. an IP/MPLS LSP.

In some examples, the server nodes 30 are controlled by a management plane, e.g. network management system (NMS) 55. In some aspects, the client nodes 20,24 are not controlled by the same NMS 55.

In the overlay model, the core network nodes 30 function as a closed system. For example, the edge nodes 20,24 do not participate in a routing protocol instance that runs among the core network nodes. In some aspects, the edge nodes are unaware of the topology of the core network nodes. This contrasts with a peer model, in which edge nodes support both a routing and a signaling protocol. In the peer model, the protocol interactions between an edge node and a core network node are the same as between two core network nodes. Aspects of the present invention apply to the overlay model.

In the overlay model, a service across the lower layer network (server network) is requested over a distinct service interface by the higher layer network (client network). Once the lower layer service has been established, it can be used as a tunnel or as a stitched LSP to support the requirements of the higher layer network. In this sense, layer refers to a network service layering, i.e. client/server.

In some examples, the server (core) network and client (overlay) network utilise different control planes and different provisioning techniques. For example, the core network uses a Generalized Multiprotocol Label Switching (GMPLS) control plane, and/or the client network utilises MPLS signalling. GMPLS defines both routing and signaling protocols for the creation of Label Switched Paths (LSPs).

The server nodes 30 are controlled by an automated control plane. The functioning of the GMPLS control plane is adapted according to examples of the invention. The client nodes 20,24 do not share a control plane with the server nodes 30. In some aspects, the server nodes 30 provide for connection-orientated transport.

In some examples, the core network uses a different switching technology than the overlay network. For example, the core network comprises wavelength (lambda) switches. Aspects of the invention relate to a server layer which is a WDM network. In some examples, the server layer is an IP network.

The client/server network architecture is different from a hierarchical routing (e.g. hierarchical LSPs). For example, the service is directly requested from the service network (in the form of a User-Network Interface (UNI)). In some aspects, the service connects elements (or segments) of the client network, whereas as a hierarchical routing would build tunnels across only the core network (i.e. between the core nodes at the edges of the core network).

Communication between the control plane of the client nodes 20,24 and control plane of the server nodes 30 is through a User-Network Interface (UNI) 50. The UNI is a reference point defined for the ASON. Further details of the UNI are described in IETF RFC 4208.

In this example, a GMPLS Overlay model can be considered as applied at the UNI 50. An interface between the edge network and the core network is the UNI reference point. Signaling is defined across the UNI 50. The network is an example of a UNI reference network between a IP/MPLS network and a WDM network. In some examples, GMPLS is used as a control plane of the transport network, and communicates with the overlay control plane via the UNI interface.

The control plane of the server network is provided with information (e.g. over the UNI 50) which is used in determining the elastic reconfiguration of the nodes. Aspects of the invention provide for operating an elastic network with a server layer control plane.

In some aspects, the UNI carries information from the IP to the Optical layer that can be used as path computation constraints. In some aspects, parameters are passed to the optical layer for an informed path computation, e.g. parameters (e.g. cost, latency) that need to be minimized during the path computation or have an upper accepted bound (e.g. jitter). The parameter may alternatively relate to diversity of protection paths.

The server nodes 30 are configured to form an elastic network. For example, the nodes 30 of the server network are configured to have one or more of: a variable bit rate, channel spacing, modulation format and/or symbol rate. The elastic capability of the nodes or network elements, e.g. variable modulation format and/or symbol rate, is controlled by the control plane.

Aspects of the invention are arranged to augment the UNI. Aspects of the invention are configured to pass particular additional information from the client nodes (e.g. IP layer) to the server nodes (e.g. WDM layer). The additional information passed enables the server nodes 30, i.e. core (WDM) network, to utilize elastic functions of the network. Aspects of the invention relate to a control plane of the server nodes 30 which is arranged to control the server nodes 30 in performing elastic reconfiguration, for example controlling (varying) one or more of symbol rate, modulation format, channel spacing and/or other parameter.

In some examples, the elastic capability of a server node uses the transponder 33 which is configured to vary line capacity. In some aspects, the elastic capability of a server node relates to a network element (e.g. optical cross-connect (OXC)) which is able to vary a bandwidth of a switching window, varying the bandwidth of the elastic optical path. In some examples, the elastic capability utilises arbitrary bandwidth channels (flexpath).

In some examples, this additional information is passed over the UNI with a signaling protocol. For example, the signaling protocol is an extension to a GMPLS protocol. In some examples, the signaling protocol used for the additional information is Resource ReserVation Protocol-Traffic Engineering (RSVP-TE) signaling protocol. The additional information may be in a defined extension to RSVP-TE. An aspect of the invention is a RSVP-TE extension to enable elastic optical networking.

In some examples, the signaling protocol is the same over the UNI and in the server layer, e.g. RSVP-TE. For example, the signaling protocol over the UNI is also the GMPLS signaling protocol. The UNI may be referred to as a GMPLS UNI. Optionally, a routing protocol is used over the UNI, which in some examples is also the GMPLS routing protocol (i.e. OSPF-TE).

The additional information communicates to the WDM layer the actual usage of the optical trail 42, i.e. in the core network. This additional information is configured to tune the transponder encoding and thus tune accordingly the optical budget.

The additional information provides information on the traffic being carried. In some examples, some (or all) of the traffic is designated as being premium traffic. The premium traffic has a higher priority than non-priority traffic. Aspects of the invention provide information on the amount of traffic designated as premium traffic. The amount of premium traffic is the amount which is restored as a priority. This premium amount is the amount which the network considers must be restored, even if other traffic is dropped.

In some aspects, if the server network determines it is not possible to deliver all traffic, then the server network delivers the premium traffic in preference to the non-premium traffic. If all the premium traffic can be delivered, and capacity is available, then at least some non-premium traffic is also delivered.

In some examples, this additional information is used when performing restoration of optical LSPs. In some cases, no feasible path is available between source and sink. In some examples, no feasible path on restoration is available between source and sink for all of the traffic.

Aspects of the invention are configured to use the indication of the amount of premium traffic being carried over the optical path, such that the core WDM network can configure a transponder of the server node 30 to best transmit traffic over the restoration route. For example, the transponder could reduce the bit rate of the transponder so to reach longer distances. This may allow the core network to restore at least the premium traffic. The configuration of the transponder is adjusted as part of an elastic network, based on the additional information.

The additional information defined by aspects of the invention provides for the client and server domains in an overlay environment to exchange information regarding the amount and type of traffic at a given time. This additional information is communicated over the UNI interface.

Examples of the invention apply to an IP over WDM network. In such a network, the client nodes 20,24 (e.g. router) ask the server nodes 30 (e.g. RROADMs) for the provisioning of an optical LSP. The optical LSP will be used/seen in the IP layer as a packet virtual link connecting two client nodes 20,24 (e.g. router).

Figure 2:
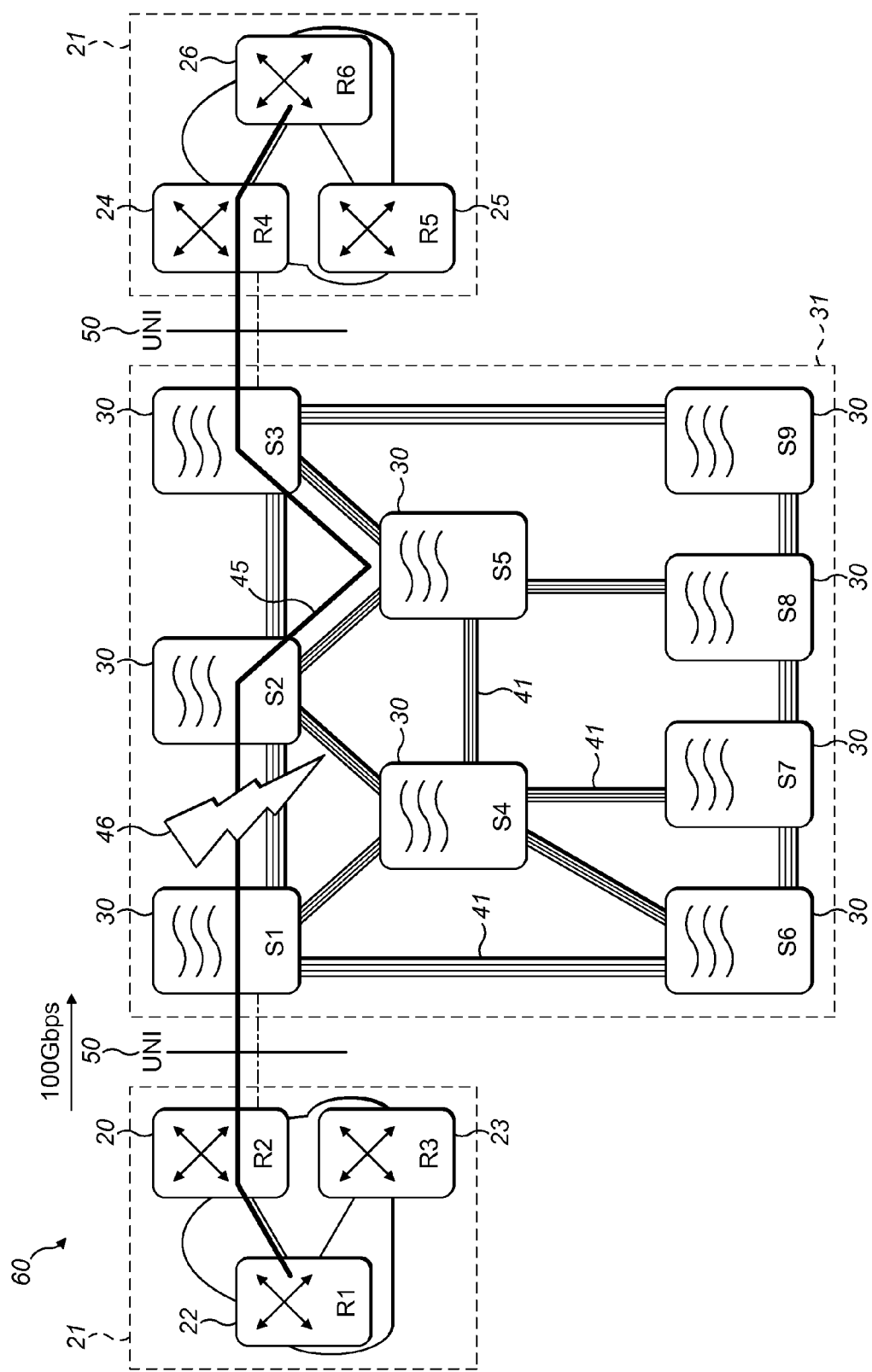
FIG. 2 shows a further example of a network according to an example of the invention.

FIG. 2 shows an example network 60. The network 60 comprises client nodes of a client network 21 connected by an optical server network 31 of server nodes 30. The server nodes 30 may be arranged in a mesh or other topology. A working path 45 is built between two client nodes, e.g. between node R1 22 and node R6 26. For example, the working path is a 100 Gbps optical path. The path 45 is built between server nodes S1 and S3, e.g. S1-S2-S5-S3 as shown.

The client nodes 20,22,23 are arranged in a client network 21. In the client network 21, the path is from R1 22 through R2 20 to a border server node S1 30. The UNI 50 is between client node 22 and server node S1 30. A further UNI 50 is between server node S3 and client node 24 of another segment of the client network 21, the path continuing to node R4 24 and then node R6 26. The client network may be referred to as a client layer network or client layer. The server network may be referred to as a server layer network or server layer.

As an example, a failure 46 occurs in the server network 31, e.g. between nodes S1 and S2. In this example, due to network occupancy and physical impairments, the network determines that there is no other path able to carry a 100 Gbps signal between the same server nodes S1 and S3. The server network 31 determines a restoration path for the amount of the premium traffic (of which the server network 31 is aware using the additional information), using the elastic capability of the server network 31.

Figure 3:
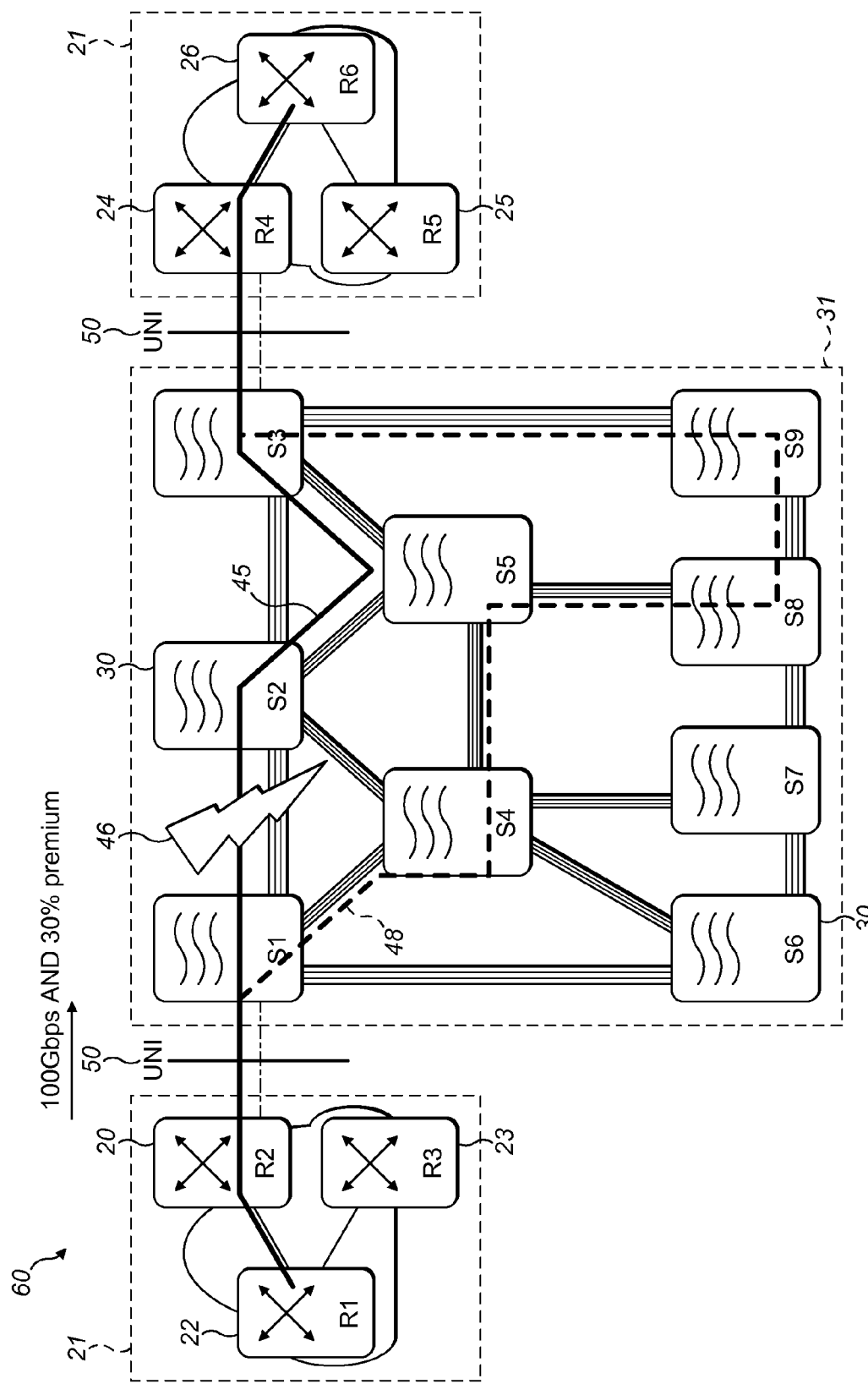
FIG. 3 shows example of a protection path on a network according to an example of the invention.

FIG. 3 shows that the network 60 is able to provide an alternate path for carrying a lower bandwidth signal between the original server nodes, e.g. S1 and S3. When performing the optical path restoration it is possible that there is no other path between two server nodes 30 at a server domain border (S1 and S3) which meet the requirements of a particular type of optical path. For example, there may be no restoration path which meets the bandwidth requirements of the original path.

A possible restoration path 48 between S1 and S3 is S1-S4-S5-S8-S9-S3. In this example, the alternate path is only able to carry 40 Gbps. In some examples, the control plane of the server network determines the restoration path.

In examples of the invention, a client node provides a server node with information relating to the traffic being carried. For example, the information relating to the traffic specifies an amount of traffic which is premium traffic, i.e. traffic which should be restored as a priority.

In the example shown, the client node R2 22 has the capability to provide server node S1 with the information, e.g. amount of traffic which should be restored as a priority.

In some cases, the information provides the amount of traffic that must be restored. In some examples, information relating to the traffic is information relating to the priority allocated to the restoring of the traffic. In some examples, the information is provided across the UNI.

The server network receives the amount of traffic which is considered of a high priority to restore (e.g. premium traffic). The control plane of the server network (e.g. PCE) determines a restoration path 48 which meets at least the requirements (e.g. bandwidth) for the high priority traffic. The restoration path is determined using the elastic properties of the network, e.g. determining a restoration path allowing for changes in the symbol rate and/or modulation type. The network uses that restoration path, even if that restoration path does not have the capacity to carry all the original traffic.

The elastic capability of the server layer network is used to determine a path for the amount of premium traffic. A restoration path which can handle the premium traffic, but not all the original working path traffic, may be selected. The information of the amount of premium traffic allows a lower capacity restoration path to be selected, allowing better use of the elastic optical capability, since the non-premium traffic can be dropped.

In some cases, the resiliency of the virtual links is demanded to the WDM layer. In some examples, the server nodes 30 provide for resiliency at a lower network service layer (e.g. WDM layer).

In some examples, the information on the amount of premium traffic is always provided, e.g. when the path is requested. Alternatively or in addition, the information is only provided, obtained and/or utilised if the restoration path 48 has a lower bandwidth than the capacity of the original working path or the amount of traffic being transmitted. In this case, the client node 22 is configured to inform the connected server node S1 of the amount of traffic of high priority if no other 100 Gbps path is available.

In some examples, only on-the-fly restoration schemes are implemented. This may reduce capital expenditure for the network. In some aspects, a complete establishment of the restoration LSP occurs only after a failure of the working LSP, and comprises using additional signaling. In some examples, back-up resources are allocated on-demand only at time of failure (i.e. on-the-fly).

In a simple example, the amount of premium traffic to be restored is e.g. 30%. One or more server network nodes are configured to utilise their elastic capability and restore at least the premium traffic. A restoration path is considered and determined for at least the premium traffic, the path requiring modifying a parameter of one or more server nodes 30, e.g. node S1. In this example, upon a failure, the network is configured to leverage on the elastic capabilities of transponders in the server nodes 30 in order to satisfy the traffic as indicated by the client layer network, e.g. over the UNI.

In this case, the network is able to restore the failed 100 Gbps path over a 40 Gbps path. This restoration path is able to restore the 30% of premium traffic and also a small percentage (10%) of the lower priority traffic, e.g. best effort IP traffic, that was being carried over the 100 Gbps trail.

The information passed over the UNI allows the server network to determine if all the premium traffic can be carried, e.g. on a restoration path, by changing the bit rate of the server nodes according to their elastic capability. The server network will select a path even if this does not have the full capacity for all traffic, but only the capacity for the premium traffic. The path may be selected based only on the capacity to carry the amount of premium traffic, or may additionally be based on other traffic parameters, e.g. latency. In some examples, the information specifying the amount of premium traffic is sent along with the request of setting up a path in the server network.

Figure 4:
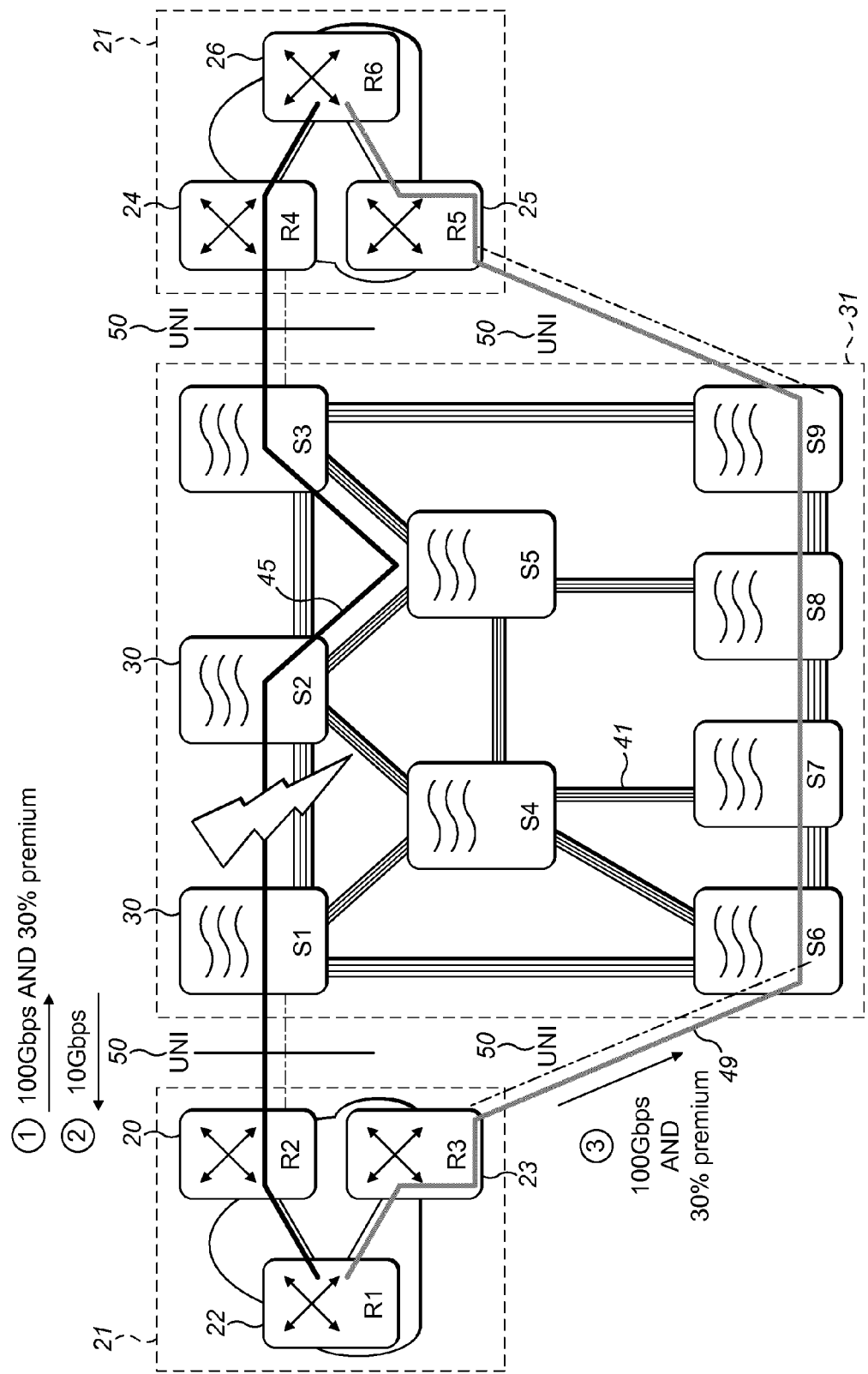
FIG. 4 shows a further example of a protection path on a network according to an example of the invention.

FIG. 4 shows a further example of the invention. In this example, the server network determines that a restoration path cannot carry at least the high priority (premium) traffic feedback between the same server border nodes S1, S3. The server network provides a feedback to the client network, e.g. to the client node connected to the core network by the UNI.

In some examples, the method determines if the bandwidth of the restoration path involving a re-routing amongst only the server nodes 30 is sufficient for at least all the premium traffic. If the restoration path is sufficient for at least all the premium traffic, this restoration path is used. If the restoration path is not sufficient for all the premium traffic, then the server network notifies this information to the client network, e.g. over the UNI. In some examples, the server network always considers whether a different UNI provides for a better restoration path, e.g. improved capacity.

The server layer network is arranged to communicate with the client layer network using different border nodes. This may be considered as a different UNI 50. The server network (e.g. server network control plane) is arranged determine if a restoration path 49 using one or more different client node can be determined which meets the requirement of carrying at least the premium traffic. The server network separately notifies both the ingress and egress segments of the client networks of the lack of bandwidth, and calculates the path 49 based on either ingress and/or egress nodes changing.

The server layer considers restoration paths which utilize the elastic capability of the server nodes, e.g. changing bit rate, the modulation format and/or symbol rate. If necessary to best use a restoration path using this elastic capability, one or both segments of the client network performs a restoration (alternate path), and a different one or pair of border nodes in the server domain is used to carry the end to end traffic.

In some examples, the client layer network (client nodes) is only involved in the determination of the restoration path if the restoration path cannot carry all the premium traffic. In other examples, alternative paths including an alternative path in the client nodes is always considered when an alternative path is required.

In some examples, a communication between the client node and server node, e.g. over the UNI, is a two way communication. For example, the client node requests (or notifies) the server node that the traffic has a certain bit rate and a certain amount is of a high priority (e.g. 100 Gbps and 30% premium). The server node notifies the client node, e.g. over the UNI, that a particular bandwidth is available on a restoration (e.g. 10 Gbps).

In this example, client node R3 23 functions as an alternative border node. The node R3 23 provides a different entry of the path into the WDM network 31, e.g. to server client node S6.

In this example, a path from client node R1 is able to pass through a different client node, i.e. node R3. The node R3 connects on a path 49 to a server layer node S6 over the UNI. The path from S6 is able to accommodate the request from R3 to node R5 via nodes S6-S7-S8-S9). In this example, the UNI 50 is used to both notify the server layer (i.e. server network) of the amount of premium traffic, and notify the client layer (i.e. client network) if this cannot be achieved even using the elastic capability of the server nodes.

In some examples, the server layer notifies the client layer to use a different UNI. The server layer determines that a different UNI is required, since all the premium traffic cannot be carried, and informs the client layer. The UNI may further be used by the server layer to notify the client layer of a change of client node which provides the UNI and/or data plane to transmit traffic onto the server layer. In some aspects, the server layer instructs the client layer to change border node. The path calculated using alternative border nodes uses the elastic capability of one or more network elements of the optical server network. In some examples, the optical server layer network calculates the new client layer network border nodes.

In some examples, the server layer considers possible paths to determine if they have the capacity for at least the premium traffic (and not necessarily the original total traffic), including paths made possible by using the elastic capability of the server nodes, e.g. changing the bit rate and/or reach. If the server layer is unable to handle the premium traffic with the original client nodes, the paths considered are from and/or to the notified alternative client nodes.

Similarly to the provisioning scenario, if a restoration path for the whole required capacity is available (e.g. 100 Gbps path), for example between S6 and S9, then this path is setup. Otherwise, if only a lower bitrate path is available which meets the requirement of carrying all the premium traffic, this path is setup. In this case, a notification message sent to the client node (e.g. R3) saying that only a lower bitrate path (e.g. 40 Gbps) is available. The client node (e.g. R2) carries out the dropping of the non-premium traffic which is beyond the capacity.

In some aspects, examples of the invention relate to elastic optical networking used with e.g. 100 Gbps transport based on single-carrier optics and e.g. 28-32 GBaud electronics. In some example, the optical transport is 400 Gbs or 1 Ttbs transport, or other transport rates.

A path calculation entity (PCE) calculates the restoration path. In the case of an SDN controller, the PCE is an application running into the SDN controller. In the case of distributed control plane, the PCE can be a centralized entity that receives queries from nodes for path computations or can be distributed on the nodes. In the latter case, each PCE only computes the paths that are originated by the node it is running on.

Examples of the invention relate to a control plane for the optical server network 31. In some examples, the control plane is implemented by a software defined network (SDN) controller for a WDM network (i.e. server network 31). The SDN controller is implemented in a computer program executed by a processor, and in some aspects, is implemented as a computer program product. Examples of the invention relate to a processor, and optionally storage, configured to execute the functions of the control plane or SDN controller. The processor may be in a network node, network element or device connected to the network.

Figure 5:
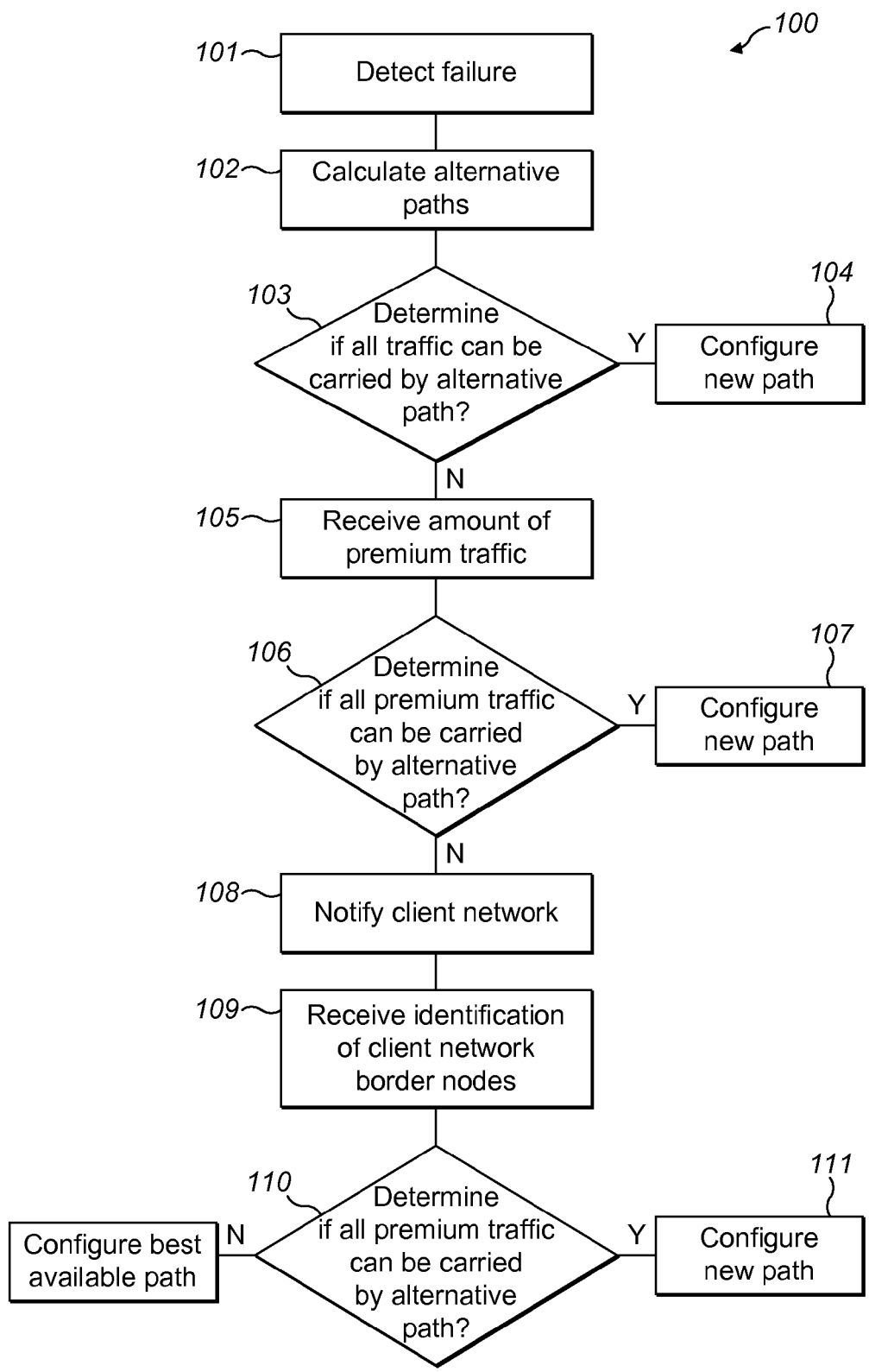
FIG. 5 shows a flowchart illustrating steps according to an example of the invention.

FIG. 5 shows an illustration of a method 100 according to an example of the invention. The method is carried out by the optical server network 31, and in some aspects, by a control plane of the optical server network 31. In particular, it is the PCE which calculates the restoration path, which is a part of the control plane.

In 101, the method determines that an alternative path is required. For example, the control plane detects a failure in a link, network element or component of the optical server network 31.

In 102, the method determines alternative paths. The alternative paths considered include those which use the elastic capability of the nodes of the optical server network 31. Therefore, paths are considered which have or require a e.g. changed bit rate, symbol rate or modulation format.

In 103, the method determines if the capacity of the alternative (i.e. restoration) path is equal to (or greater than) the previous path. If the capacity is such as to be able to carry all of the current traffic, that path is configured by the control plane in 104. In some examples, the configuration of the path comprises configuring one or more nodes to use its elastic capability, e.g. changing symbol rate and/or modulation format.

If the capacity of the alternative paths is not able to carry the same amount of traffic, the method in 105 comprises obtaining an amount of premium traffic to be restored. The amount of premium traffic is obtained from the server network, e.g. across the UNI. The amount of premium traffic is obtained before or after the failure is detected, and/or before or after the server network determines that a restoration path for all traffic is not possible even using the elastic capability. In some examples, the amount of premium traffic is received when the path is requested. The server layer may use the amount of premium traffic when calculating any restoration path, and is not limited to a separate step following a determination that all traffic cannot be carried by an alternative path.

In 106, the method comprises determining if all the premium traffic can be sent on a restoration path of the optical server network. If at least all the premium traffic can be sent on a restoration path, then this path is configured in 107. In some examples, the configuration of the path comprises configuring one or more nodes to use its elastic capability, e.g. changing symbol rate and/or modulation format.

If all the premium traffic cannot be sent on a restoration path of the optical server network 31, then the method in 108 provides a notification to the client network. The client network is arranged to carry out a restoration on receiving such a notification. A notification is received in 109 of the restoration of the client network, which provides identification of one or more different border nodes of the server network. The different border nodes of the server network are used to calculate further possible restoration paths, using the elastic capability of the optical server network. In some examples, alternative paths are initially considered which involve a change of client network node, and is not limited to a separate step after determining paths using the same client network nodes.

Alternative paths are calculated in the optical server network based on the changed client network. In 110, the method comprises determining if all the premium traffic can be sent on a restoration path of the optical server network. If at least all the premium traffic can be sent on a restoration path, then this path is configured in 111. In some examples, the configuration of the path comprises configuring one or more nodes to use its elastic capability, e.g. changing symbol rate and/or modulation format.

If no alternative path is possible for all the premium traffic, then the best (i.e. highest capacity) path is configured in 110. In some examples, the configuration of the path comprises configuring one or more nodes to use its elastic capability, e.g. changing symbol rate and/or modulation format. If there is still no path possible for all the premium traffic, then traffic is lost.

In some examples, the configuration of the path comprises configuring one or more nodes to use its elastic capability, e.g. changing symbol rate and/or modulation format. The order of the features of the method as described is not limiting. In particular, the method may comprise carrying out one or more of these aspects in a different order.

An example of the invention relates to a method and apparatus of the client network. As described above, the control plane of the client network is configured to transmit information across the UNI of the actual usage of the traffic, e.g. an amount of premium traffic. The client network is also configured to perform a restoration, if required by the server network.

Figure 6:
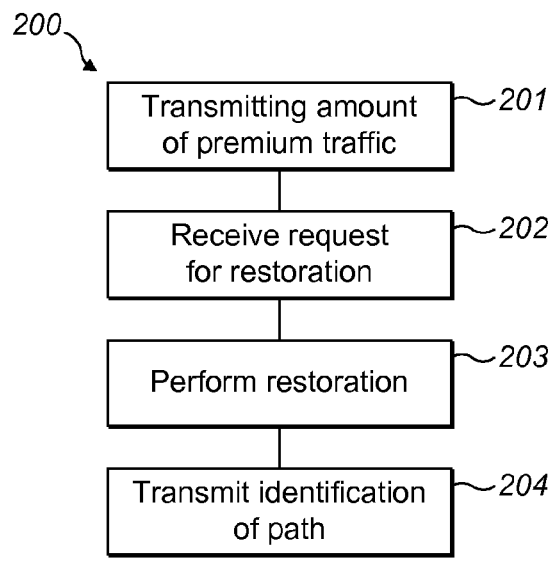
FIG. 6 shows a flowchart illustrating steps according to a further example of the invention.

FIG. 6 shows an example of a method 200 carried out by the client network 21, and in some aspects, by the control plane of the client network 21. The method 200 comprises transmitting information in 201, which specifies an amount of premium traffic which is passed from the client network 21 to the server network 31. The information is transmitted over the UNI. For example, the information is included in signalling, i.e. in a signalling protocol. The information is transmitted continuously, at predefined intervals or events, or on demand from the server network.

In some optional aspects, the method 200 further comprises receiving a request for restoration of the client network 21 from the server network 31, in 202. If this request is received, a restoration is performed in 203. The restoration is arranged to determine an alternative path for traffic from the client network to the server network 31.

Optionally, the client network transmits identification of the alternative path to the server network in 204. The identification may be an explicit identifier in signalling. Alternatively, the identification may be implicit, e.g. merely by using a different node of the client network for communication, e.g. the UNI is between different nodes. In some aspects, no identification is sent since the server layer requested the change of nodes, and so is aware of the new client border node.

Features 202,203,204 are optional, and in some examples are only carried out if the server network 31 is not able to determine a path for all the premium traffic using the elastic capability of the nodes 30 of the server network.

Figure 7:
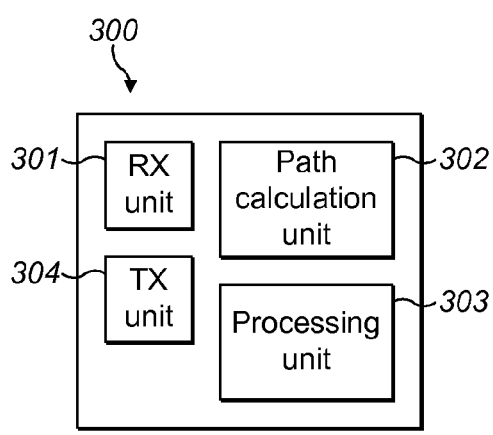
FIG. 7 shows an apparatus according to an example of the invention.

FIG. 7 shows an example apparatus 300 configured to function in accordance with any example of the invention. For example, the apparatus 300 is an apparatus of the server network, e.g. a PCE or SDN controller. The apparatus 300 is described as having logical functions. The apparatus 300 is part of a network element or node functionally connected to the server network. In the case of a SDN controller, some examples comprise a dedicated server connected to the data communications network (DCN) of the server network. The DCN is the management network through which it is possible to reach any node.

A receiving unit 301 is configured to obtain an indication of an amount of premium traffic from a client network. For example, the receiving unit 301 receives the signalling protocol used from the client network, e.g. over the UNI 50. The signalling protocol includes a usage of the traffic, e.g. an amount of premium traffic.

The apparatus 300 further comprises a functional path calculation unit 302 configured to consider possible paths. The paths considered include those which utilise an elastic capability of one or more network elements of the optical server network. The path calculation unit 302 is further configured to select a path from the considered paths. The path selected has at least a capacity to carry the amount of premium traffic.

The apparatus 300 comprises a processing unit 303. In some aspects, the processing unit 303 is configured to generate signalling or configuration messages to the server nodes 30 to set up the alternative (restoration) path. For example, in the case of an SDN controller is configured to generate configuration messages to be sent from the controller to the server nodes for configuring paths.

A transmission unit 304 is configured to transmit any signalling from the apparatus. For example, the transmission unit 304 may transmit signals to configure the server nodes 30 or communicate over the UNI to request a restoration by the client network, as described above.

Figure 8:
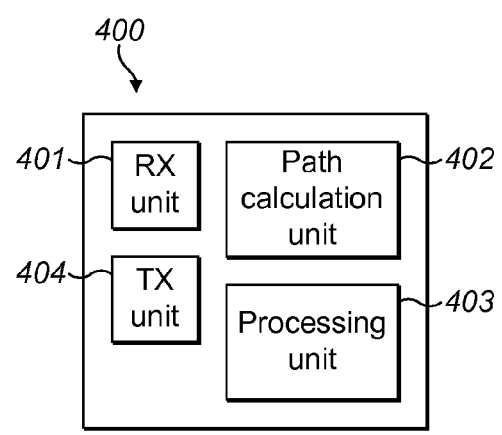
FIG. 8 shows an apparatus according to a further example of the invention.

FIG. 8 shows an example apparatus 400 configured to function in accordance with any example of the invention. For example, the apparatus 400 is a SDN controller. The apparatus 400 is described as having logical functions. The apparatus 400 is part of a network element or node functionally connected to the client network. The apparatus 400 is configured to control transmission of traffic from a client network to an optical server network.

The apparatus comprises a transmission unit 404 configured to transmit an amount of premium traffic from a client network to the optical server network. In some aspects, this information is transmitted over the UNI.

The apparatus further comprises a receiving unit 401. The receiving unit is configured to receive a notification from the server network that a restoration of the client network is required. This is in response to a determination by the server network that, even using the elastic capability of the server nodes, a path for the premium traffic is not found using the current client nodes.

Optionally, the apparatus 400 further comprises a path calculation unit configured to consider alternative paths to connect to the optical server network.

Optionally, the transmission unit 404 is further configured to transmit identification of the changed client network path to the server network.

The apparatus 400 comprises a processing unit 403. For example, the apparatus 400 is a SDN controller of the client layer. The SDN controller of the client layer configures paths in the client layer and informs the border nodes, e.g. R2, to ask the server layer for the setup of connectivity between two client nodes (e.g. R2 and R4). How the connectivity is created between the client layer nodes (e.g. R2 and R4) is a duty of the server layer (e.g. being a GMPLS control plane or a server layer SDN controller).

The above units are functional only, and are not limited to separate functional units. One or more units may be combined (e.g. path calculation unit and processing unit). The functions of one or more units may be carried out by separate units. The functions of the apparatus may be implemented in software, firmware and/or hardware.

In some implementations, the symbol rate used is kept constant and the modulation format changed to achieve various capacities. For example, approximately 50 Gbps for DP-BPSK to 100 Gbps for DP-QPSK to 200 Gbps for DP-16QAM. For line rates beyond 100 Gbps, examples of the invention may utilise e.g. 2 to 4 wavelengths for 400 Gbps, and 4 to 10 wavelengths to provide an aggregate capacity of 1 Tbps. In case of multi-wavelength line interfaces, aspects of the invention selectively allocate the symbol rate to each carrier. In further examples, aspects of the invention switch off completely one or more unused sub-carriers if this is advantageous in terms of spectral or power efficiency.

Features of examples of the invention are enabled by the ability to change the modulation format and/or the bit-rate of a line card of the nodes. In this way the occupied bandwidth, which depends on the symbol rate, can be traded-off with the reach.

The combination of the use of elastic capabilities of the server network and the reduced capacity requirement in handling only the premium traffic provides for more alternative paths to be used. This increases the probability that at least the premium traffic will be successfully restored. The server layer obtaining the amount of premium traffic, e.g. over the UNI, allows the alternative path to be selected automatically and dynamically.

In further examples, the notification of lack of capacity for the premium traffic from the server layer to the client layer, e.g. over the UNI, allows for further path options to be considered with the elastic capability of the server nodes.

The combination of features of examples of the invention provides for a dynamic on demand elastic optical network. For example, the information on the type (e.g. class of service) of traffic and allows a re-configuration of the elastic optical network (i.e. using the elastic properties). In some examples, this is used when a restoration path is required, e.g. following a failure. Aspects of the invention allows for automatic operation of an elastic optical network. This allows operation without a manual change or a network operator intervention.

Aspects of the invention allow a IP/MPLS network to request a particular bandwidth, e.g. a 100 Gbps Lambda trail, and also pass on information on the actual usage of that lambda or on the traffic composition e.g. how much of that traffic is Best Effort and how much is Premium traffic. This information allows the DWDM network to tune the transponder in case a new and longer path needs to be created, e.g. for restoration purposes. Thus, the advantages of elastic optical networks are used with the client layer network, which is able to dynamically and autonomously request bandwidth to the server layer network. In this case, requirements are stated by the client layer operator which can ask the server layer for connectivity with requirements (via the UNI). Aspects of the invention need to differentiate only between traffic that must be restored and traffic that may be dropped so to restore the more valuable traffic.

Some aspects of the invention provide for leveraging on the advantages of elastic networks in a dynamic environment, for example, IP over (D)WDM networking. The network is able to dynamically tune the transponders of the optical nodes, in order to increase/decrease bit rate and modify modulation format. This tuning of the transponders allows:

1. Restoring a higher quantity of traffic. This may be provided by decreasing the bit rate, and so providing a reach to longer distances. In some examples, reaching the same end point through longer paths increases the number of alternate path and allows successful restoration.
2. Improving energy efficiency. The elastic optical networking allows dynamically reducing transponders bitrate and hence power consumption when the IP traffic over the lambda decreases. Aspects of the invention provide for dynamically tuning the transponders depending on the amount of IP traffic flows, e.g. in an IP over (D)WDM system.

In some cases the additional information indicates a class of service of the traffic being carried. The class of service passed to the server layer is used to indicate the amount of traffic that must be restored. For example, the server layer associates one or more values of class of service as a premium class, for which a restoration path is prioritized above the remaining values of class of service. As described, the elastic optical network restoration is based on the amount of traffic designated as premium.

The premium traffic may be considered as having a class or importance value above a threshold. Information on the class of the traffic may be transmitted to the server network other than the amount of premium traffic. For example, the traffic is manipulated such that the amount of premium traffic (e.g. 40% of traffic) is one or more classes, e.g. class 1 and 2. The remainder (e.g. 60%) is designated as non-premium traffic is considered as a lower class (e.g. classes 3-8). The server layer is configured such that traffic belonging to the premium classes (e.g. classes 1 and 2) must be restored as a priority using elastic optical networking, whereas the traffic for the remaining classes is droppable. Alternatively, the additional information passed over the UNI only indicates the amount of premium traffic.

Aspects of the present invention may comprise a computer program or computer program product, configured to run on a computer or processing unit, to carry out at least some of the functions described. The computer program may run on the processing unit of the apparatus. In some examples, the apparatus may be implemented in a network node, management system, or in any apparatus connected to the network.

Examples of the invention may be implemented in any node, server, network management system (NMS) or Software-defined networking (SDN) controller. Examples of the invention may be implemented as a library or an application.

One or more functions of the apparatus or steps of the method may be performed at a separate apparatus or a separate time. Any aspect of any embodiment may be combined with any feature of any other embodiment.

The invention claimed is:

1. A method of determining a path in an optical server network, comprising:
    obtaining an indication of an amount of premium traffic from a client network,
    considering paths utilizing an elastic capability of one or more network elements of the optical server network;
    selecting a path from the considered paths, wherein the path is selected based at least partially on having at least a capacity to carry the amount of premium traffic;
    wherein considering paths utilizing an elastic capability of one or more network elements comprises determining a path using one or more of a changed symbol rate and a changed modulation format.

2. The method as claimed in claim 1 wherein the indication of the amount of premium traffic is received over a user network interface (UNI).

3. The method as claimed in claim 1 wherein the server network receives the indication of the amount of premium traffic from a control plane of the client network, and the server network determines the path based at least partially on the received indication of the amount of premium traffic.

4. The method as claimed in claim 1, wherein the considering paths which use an elastic capability of one or more network elements comprises determining a path using a changed bit rate.

5. The method as claimed in claim 1, wherein the determined path has a capacity less than a total amount of traffic requested by the client network.

6. The method as claimed in claim 1, comprising determining a path for at least the premium traffic based on one or more alternative border network elements of the server network, and optionally, the client network.

7. The method as claimed in 6 comprising determining that a path in the optical server network for at least the premium traffic is not available with one or more current border client network element of the client network or border server network element of the server network, and
    instructing the client network to use one or more alternative border client or server network element.

8. The method as claimed in claim 1, wherein the instructing the client network of one or more alternative border client or server network elements is over a user network interface (UNI).

9. The method as claimed in claim 1, wherein the optical server network has a GMPLS control plane, or, the server network comprises a SDN controller.

10. The method as claimed in claim 1, wherein the indication of an amount of premium traffic from the client network is received in a signalling protocol, and optionally, in a RSVP-TE signalling protocol.

11. The method as claimed in claim 1, wherein a control plane of the optical server network determines the path as an on-the-fly restoration, following a failure in the optical server network.

12. A computer program product, configured when run on a computer to conduct a method according to claim 1.

13. A control plane protocol for an optical server network, the control plane protocol configured to:
    obtain an indication of an amount of premium traffic from a client network,
    consider paths utilizing an elastic capability of one or more network elements of the optical server network;
    select a path from the considered paths, wherein the path is selected based at least partially on having at least a capacity to carry the amount of premium traffic;
    wherein the control plane protocol configured to consider paths utilizing an elastic capability of one or more network elements of the optical server network comprises the control plane protocol configured to determine a path using one or more of a changed symbol rate and a changed modulation format.

14. The control plane protocol as claimed in claim 13 wherein the indication of the amount of premium traffic is received over a user network interface (UNI).

15. An apparatus configured to determine a path in an optical server network, the apparatus comprising:
    a computer program; and
    a processor, when executing the computer program, configured to:
        obtain an indication of an amount of premium traffic from a client network,
        consider paths utilizing an elastic capability of one or more network elements of the optical server network;
        select a path from the considered paths, wherein the path is selected based at least partially on having at least a capacity to carry the amount of premium traffic;
    wherein the processor configured to consider paths utilizing an elastic capability of one or network elements of the optical server network comprises the processor configured to determine a path using one or more of a changed symbol rate and changed modulation format.

16. A method of a client network connected to an optical server network, comprising:
    transmitting information of an amount of premium traffic from the client network to the optical server network, wherein the optical server network is an elastic optical network;
    wherein the elastic optical network is reconfigurable using one or more of a changed symbol rate and a changed modulation format.

17. The method as claimed in claim 16 further comprising receiving instructions from the optical server network to use an alternative border node, and transmitting at least premium traffic to the elastic optical network on the alternative border node.

18. An apparatus configured to control transmission of traffic from a client network to an optical server network, the apparatus comprising:
    a computer program; and
    a processor, when executing the computer program, configured to transmit information of an amount of premium traffic from a client network to the optical server network, wherein the optical server network is an elastic optical network and the elastic optical network is reconfigurable using one or more of a changed symbol rate and a changed modulation format.

19. The apparatus as claimed in claim 18, wherein the processor, when executing the computer program, is further configured to:
    receive an instruction to use an alternative border node; and
    consider paths to connect to the optical server network;
    wherein the client network is configured to transmit traffic to the server network on the alternative border node.

\* \* \* \* \*